(12) United States Patent
Huang

(10) Patent No.: US 11,291,292 B2
(45) Date of Patent: Apr. 5, 2022

(54) ELASTICALLY-PRESSED ELECTRIC TOOTHBRUSH HEAD

(71) Applicant: Shenzhen E-WORLD Technology Limited, Shenzhen (CN)

(72) Inventor: Xiangyu Huang, Shenzhen (CN)

(73) Assignee: SHENZHEN E-WORLD TECHNOLOGY LIMITED, Shenzhen (CN)

( * ) Notice: Subject to any disclaimer, the term of this patent is extended or adjusted under 35 U.S.C. 154(b) by 0 days.

(21) Appl. No.: 17/528,211

(22) Filed: Nov. 17, 2021

(65) Prior Publication Data

US 2022/0071380 A1   Mar. 10, 2022

(51) Int. Cl.
*A61C 17/22*   (2006.01)
*A46B 5/00*   (2006.01)
*A61C 17/34*   (2006.01)

(52) U.S. Cl.
CPC .......... *A46B 5/0095* (2013.01); *A61C 17/222* (2013.01); *A61C 17/3481* (2013.01)

(58) Field of Classification Search
CPC ......... A46B 5/0095; A46B 5/002; A46B 9/04; A46B 13/023; A61C 17/222; A61C 17/3481
See application file for complete search history.

(56) References Cited

U.S. PATENT DOCUMENTS 11,096,768 B1 *   8/2021   Lin ...................... A61C 17/222

* cited by examiner

*Primary Examiner* — Shay Karls
(74) *Attorney, Agent, or Firm* — Andrew C. Cheng

(57) ABSTRACT

An electric toothbrush head includes a brush body. The brush body includes an insertion cavity and a plug-in unit inserted into the insertion cavity. The plug-in unit includes a friction arm and an elastic arm cooperatively forming a pressing channel therebetween. The elastic arm has a bending section with a pressing surface facing the pressing channel. The friction arm has a convex section with a friction surface facing the pressing channel. The pressing surface and a concave-convex structure of the convex section press opposite sides of a vibration unit to fix the vibration unit in the pressing channel. The convex section has a concave surface facing an inner side wall of the insertion cavity, with a curved interval formed between the concave surface and the inner side wall. An elastic rubber block is filled in the curved interval and the elastic rubber block abuts against the inner side wall.

10 Claims, 9 Drawing Sheets

ELASTICALLY-PRESSED ELECTRIC TOOTHBRUSH HEAD

TECHNICAL FIELD

The present disclosure relates to the technical field of electric toothbrush heads, in particular to an elastically-pressed electric toothbrush head.

BACKGROUND

With the continuous improvement of the quality of life, electric toothbrushes have been vigorously promoted by the market. A typical electric toothbrush includes a brush head that produces high-frequency vibration through rapid rotation or vibration of a vibration unit, such that the toothpaste is instantly decomposed into tiny bubbles which penetrate into and thus clean crevices between teeth. At the same time, the vibration of bristles of the brush can promote the blood circulation of the mouth and has a massage effect on the gingival tissue.

The electric toothbrush includes a brush handle and a toothbrush head. The vibration unit is provided at the top of the brush handle. The toothbrush head has a guiding channel with a bottom opening. The bristles are arranged on the toothbrush head. The vibration unit of the brush handle is inserted into the guiding channel of the toothbrush head from bottom to top. The vibration unit abuts against the guiding channel. Thus, with the high frequency vibration of the vibration unit, the brush bristles on the toothbrush head are driven to vibrate to realize the function of brushing teeth.

In the existing technology, when the brush handle is assembled with the toothbrush head, the vibration unit of the brush handle is inserted into the guide channel, and the vibration transmission is realized by direct close contact between the vibration unit and an inner side wall surface of the guide channel. However, the contact between the vibration unit and the inner side wall surface of the guide channel is a hard contact, which is not stable and may affect the vibration transmission between the vibration unit and the toothbrush head.

SUMMARY

The present disclosure is directed to an electrically-pressed electric toothbrush head, which can provide stable connection between the electric toothbrush head and the vibration unit.

The elastically-pressed electric toothbrush head includes: a brush body, wherein an insertion cavity with a bottom opening is formed in a lower part of the brush body; and a plug-in unit is inserted into the insertion cavity via the bottom opening; and a lower part of the plug-in unit has a guiding channel therein; and a bottom of the plug-in unit has an insertion opening for allowing insertion of a vibration unit of flat shape into the guiding channel. An upper part of the plug-in unit includes a friction arm extending upward and an elastic arm extending upward, the friction arm and the elastic arm are spaced apart and arranged opposite to each other, the friction arm and the elastic arm cooperatively form a pressing channel therebetween, a top of the guiding channel extends to a bottom of the pressing channel; A central part of the elastic arm is bent and convex towards the pressing channel to form a bending section, an inner side of the bending section has a pressing surface facing the pressing channel, an outer side of the bending section has a non-pressing surface facing an inner side wall of the insertion cavity, with an interval between the non-pressing surface and the inner side wall of the insertion cavity; A central part of the friction arm is bent and convex towards the pressing channel to form a convex section, the convex section is arranged opposite to the bending section, an inner side of the convex section has a friction surface facing the pressing channel, the friction surface is provided with a concave-convex structure, an outer side of the convex section has a concave surface facing an inner side wall of the insertion cavity, a curved interval is formed between the concave surface and the inner side wall of the insertion cavity, an elastic rubber block is filled in the curved interval and the elastic rubber block abuts against the inner side wall of the insertion cavity. A bending radian of the bending section is greater than that of the convex section, and an elastic structure is connected between a top of the elastic arm and a top of the friction arm; the vibration unit is inserted into the guiding channel from bottom to top through the insert opening and inserted into the pressing channel and passes between the convex section and the bending section; the pressing surface of the bending section and the concave-convex structure of the convex section press opposite sides of the vibration unit respectively to fix the vibration unit in the pressing channel; the convex section and the bending section are pressed by the vibration unit to elastically deform towards the inner side wall of the insertion cavity respectively; when the elastic arm and the friction arm deform away from each other, the elastic structure is elastically deformed and thus elongated.

In some embodiments, the concave-convex structure comprises multiple elongated grooves transversely extending on the friction surface, and the elongated grooves are arranged orderly and intervally along an extension direction of the friction arm; elongated convexes are formed between adjacent elongated grooves, which extend in the transverse direction, and the elongated convexes are used to press one side of the vibration unit.

In some embodiments, each of the elongated convexes has a lower side surface downward, an upper side surface facing upward, and a pressing surface configured to press one side of the vibration unit, and the pressing surface is formed between the upper side surface and the lower side surface; the lower side surface of each one of the elongated convexes is covered with an elastic rubber layer; an inner end of the elastic rubber layer extends to a bottom of an adjacent one of the elongated grooves; an outer end of the elastic rubber layer extends to the pressing surface of the each one of the elongated convexes; and a deformation interval is formed between the elastic rubber layer and the upper side surface of an adjacent one of the elongated convexes.

In some embodiments, a plurality of transversely extending steel wires extends in the elastic rubber block, and the steel wires are arranged at intervals along an extension direction of the friction arm.

In some embodiments, a middle of the non-pressing surface is recessed toward the pressing channel and forms a transversely arranged deformation slot that extends through opposites ends of the bending section.

In some embodiments, the elastic structure is made of a soft rubber material, and comprises two connecting parts and a deformation section between the two connecting parts; two ends of the deformation section are respectively connected with the two connecting parts, and the two connecting parts are respectively connected at a top of the friction arm and a top of the elastic arm; when the elastic arm and the friction arm deform away from each other, the deformation section is elastically deformed and thus elongated.

In some embodiments, the deformation section is provided therein with a hollow space which extends along a path between the two connecting parts; the hollow space divides the deformation section into two deformation strips arranged in parallel; a plurality of connecting bars made of soft rubber material is disposed in the hollow space, and the connecting bars are arranged at regular intervals along a length direction of the hollow space; and opposite two ends of each one of connecting bars are respectively connected with the two deformation strips.

In some embodiments, the connecting part is a connecting sleeve, and the connecting sleeve has a sleeve cavity with a downward opening; a sleeve cavity of one connecting sleeve is fixed on a top of the friction arm, and the other is fixed on a top of the elastic arm, with the deformation section being arranged between the friction arm and the elastic arm.

In some embodiments, the sleeve cavity has a peripheral wall with a metal ring embedded in the peripheral wall, and the metal ring is arranged along a circumferential direction of the sleeve cavity.

In some embodiments, the guiding channel has a top opening connected to pressing channel, and the top opening of the guiding channel is rectangular in shape and defined by two non-pressing edges and two pressing edges, the two non-pressing edges being arranged closer to the elastic arm or the friction arm; and the two pressing edges are arranged between the two non-pressing edges, and the two pressing and two non-pressing edges are connected to one another so as to cooperatively form a rectangular shape. When the vibration unit passes through the top opening of the guiding channel from bottom to top, the two pressing edges abut against two opposite sides of the vibration unit, respectively, and a gap is formed between each non-pressing edge and a corresponding side of the vibration unit.

Compared with the existing technology, in the elastically-pressed electric toothbrush head provided by the disclosure, when the vibration unit is inserted into the pressing channel via the insertion opening, the bending section and the convex section are elastically deformed away from each other, and the vibration unit is clamped by the pressing surface and the concave-convex structure of the friction surface, so as to be fixed in the pressing channel. Secondly, upon elastic deformation of the bending section and the convex section away from each other, the elongated elastic structure applies opposite tension to the elastic arm and the friction arm, so that the pressing surface and the concave-convex structure can more stably clamp the vibration unit therebetween with elastic pressing and clamping. The clamping is stable, which can better realize the vibration transmission between the vibration unit and the electric toothbrush head.

DETAILED DESCRIPTION OF THE EMBODIMENTS

In order to make the purpose, technical scheme and advantages of the disclosure clearer, the following illustration and implementation examples are combined to further explain the disclosure. The specific embodiments described here are only used to explain the disclosure and are not used to limit the disclosure.

In the following, the realization of the disclosure is described in detail with specific embodiments.

The same or similar labels in the figures to this embodiment correspond to the same or similar components; in the description of the disclosure, if the orientation or position relationship indicated by the terms "upper", "lower", "left" and "right" is based on the orientation or position relationship shown in the figures, it is only for the convenience of describing the disclosure and simplifying the description, rather than indicating or suggesting that the device or component referred to must have a specific orientation, construct and operate in a specific orientation. Therefore, the terms used to describe the position relationship in the figures are only used for illustrative description and cannot be understood as a limitation to the disclosure. For ordinary technicians in this field, the specific meaning of the term can be understood on a case-by-case basis.

Figure 1:
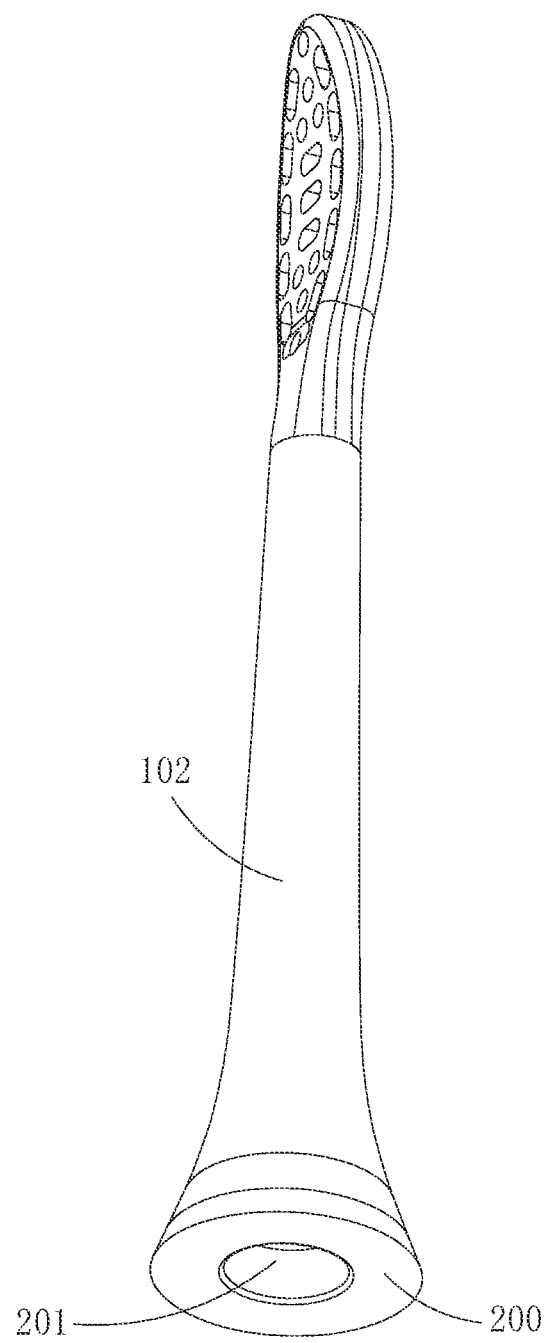
FIG. 1 is a perspective view of an elastically-pressed electric toothbrush head according to one embodiment of the present disclosure.
Figure 2:
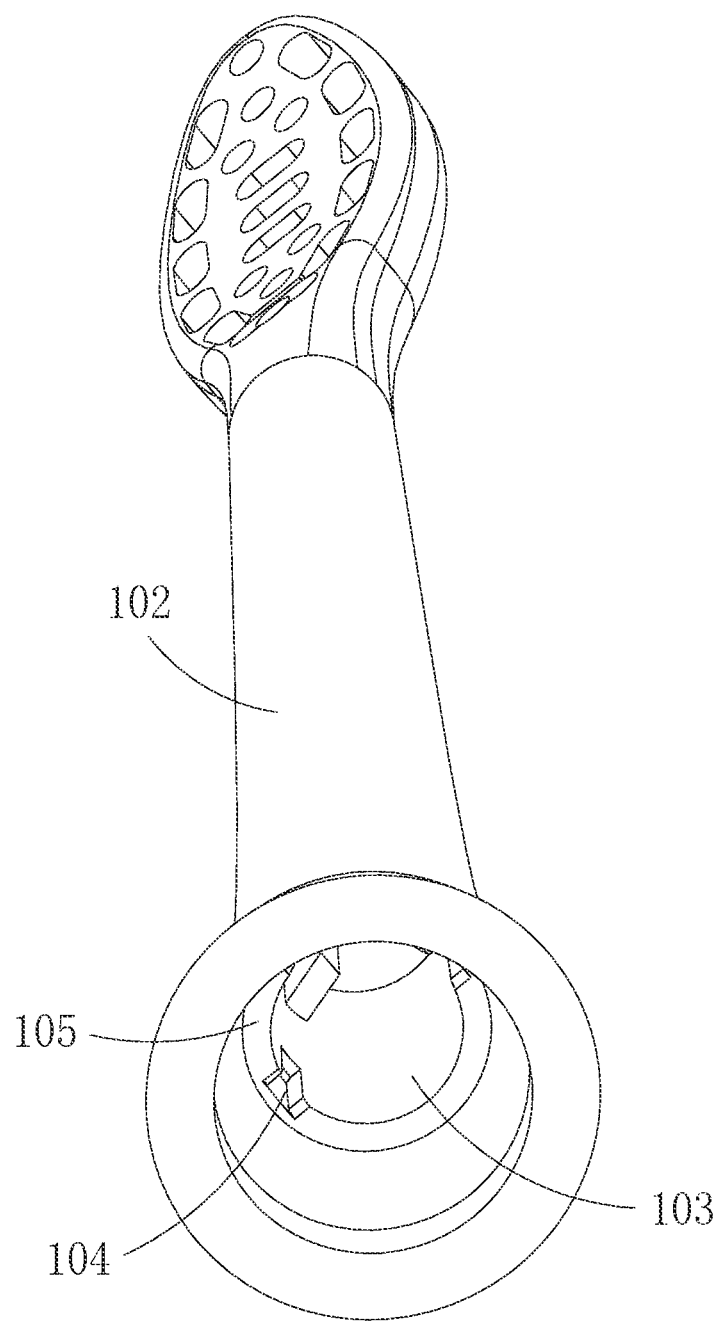
FIG. 2 is a perspective view of a brush body according to one embodiment of the present disclosure.
Figure 3:
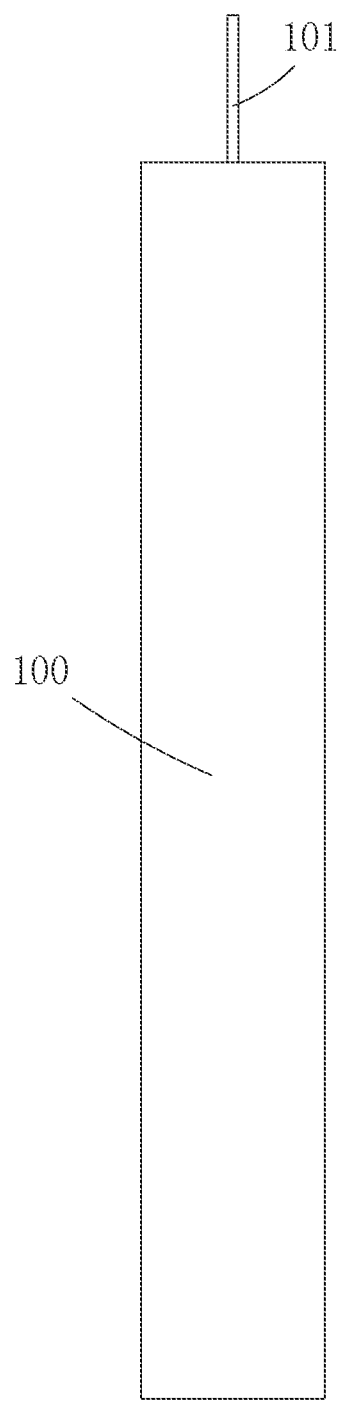
FIG. 3 is a perspective view of a brush handle according to one embodiment of the present disclosure.
Figure 4:
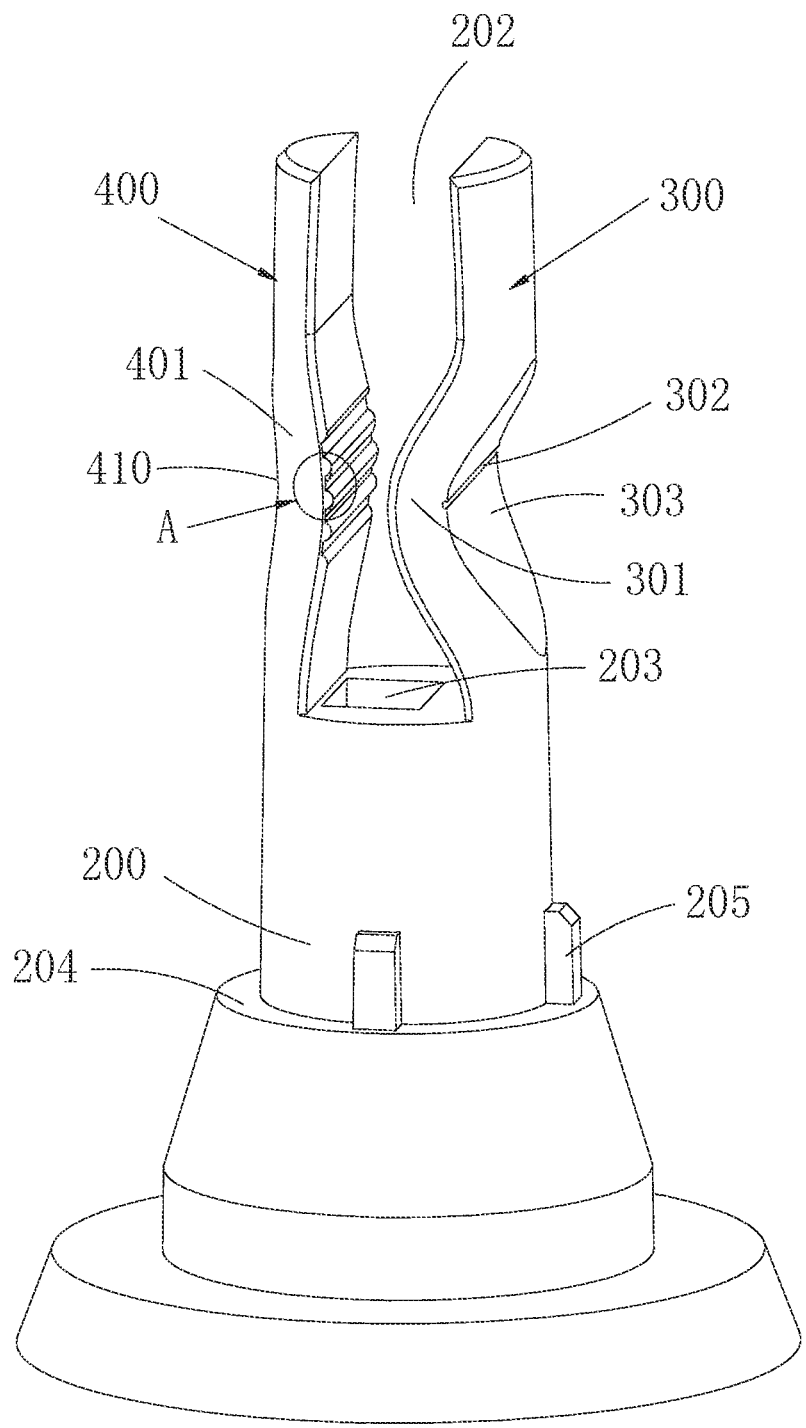
FIG. 4 is a perspective view of a plug-in unit according to one embodiment of the present disclosure.
Figure 5:
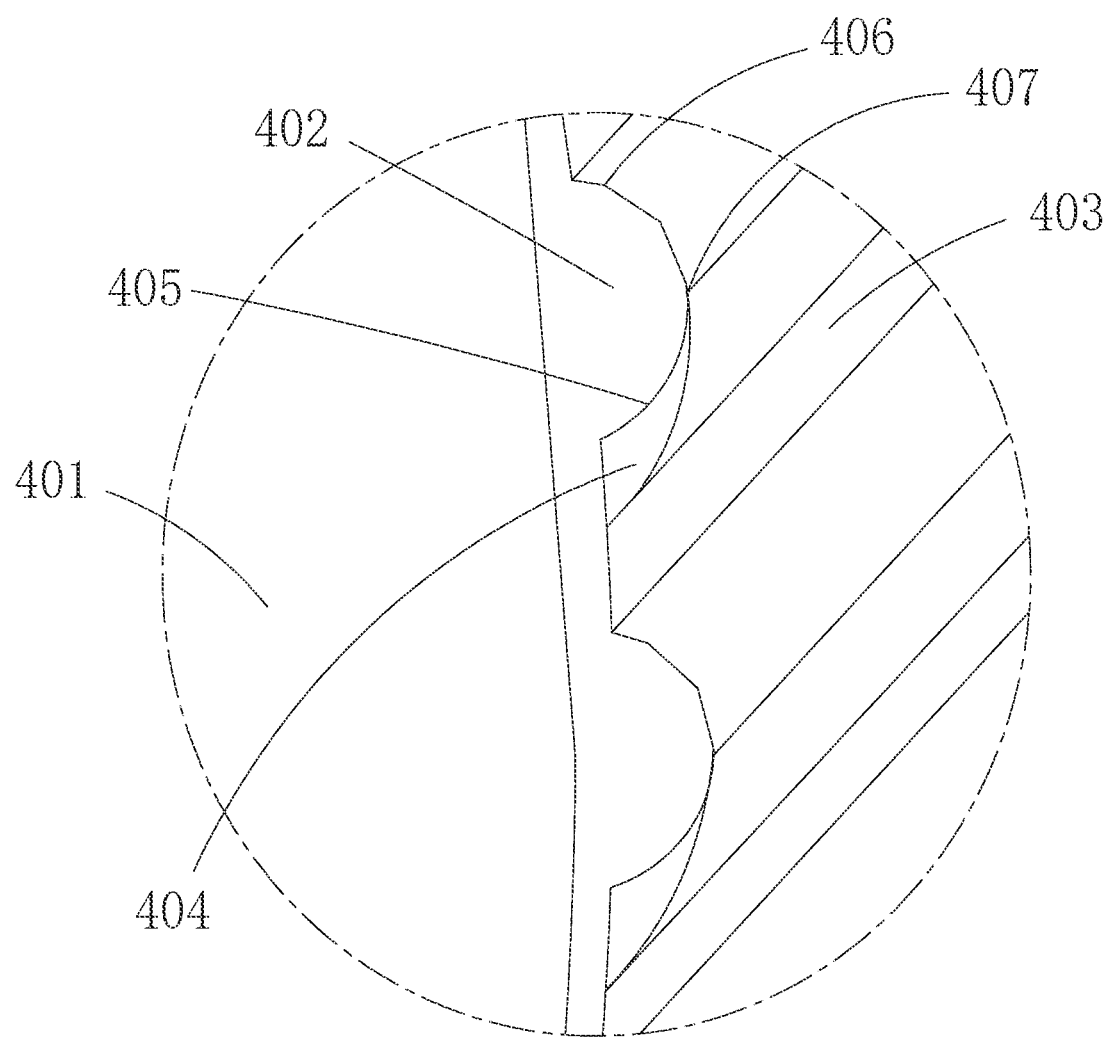
FIG. 5 is an enlarged view of a portion A in FIG. 3.
Figure 6:
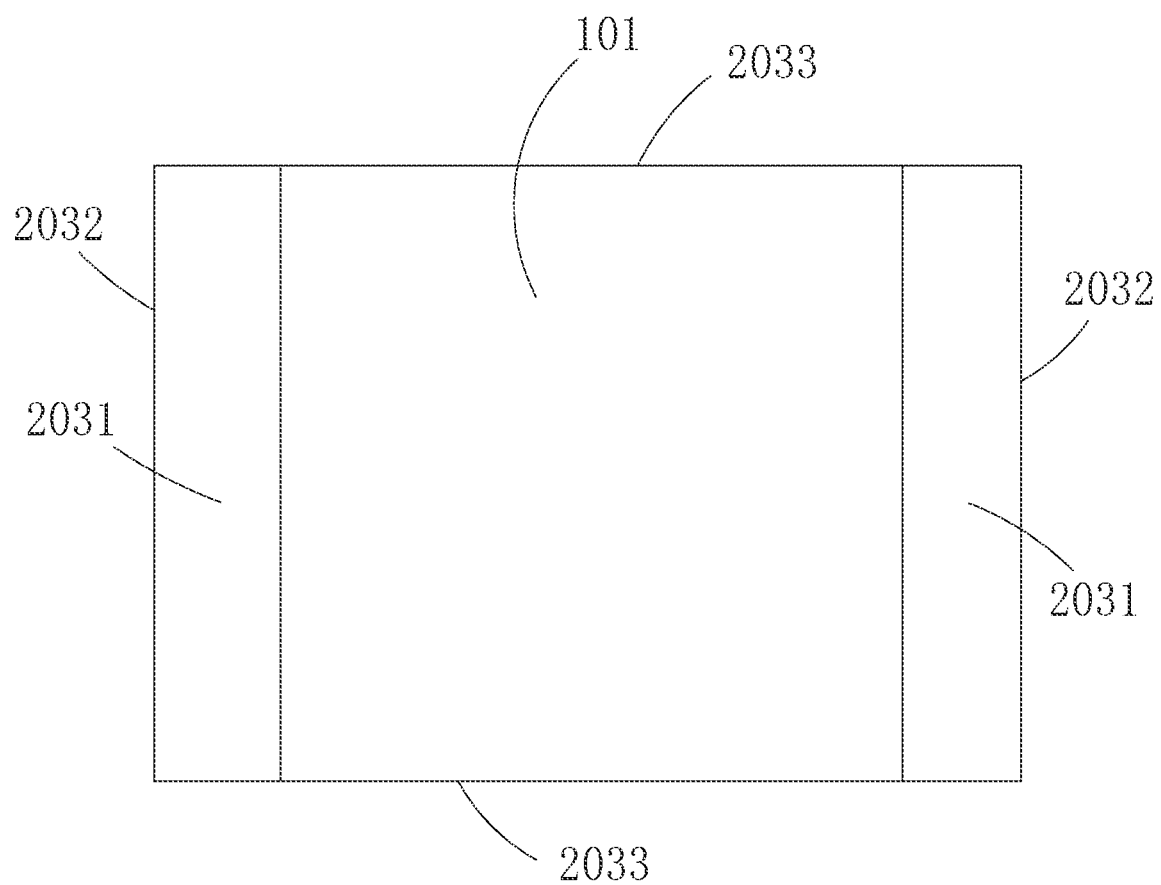
FIG. 6 illustrates cooperation between a vibration unit and a top opening of a guide channel according to one embodiment of the present disclosure.
Figure 7:
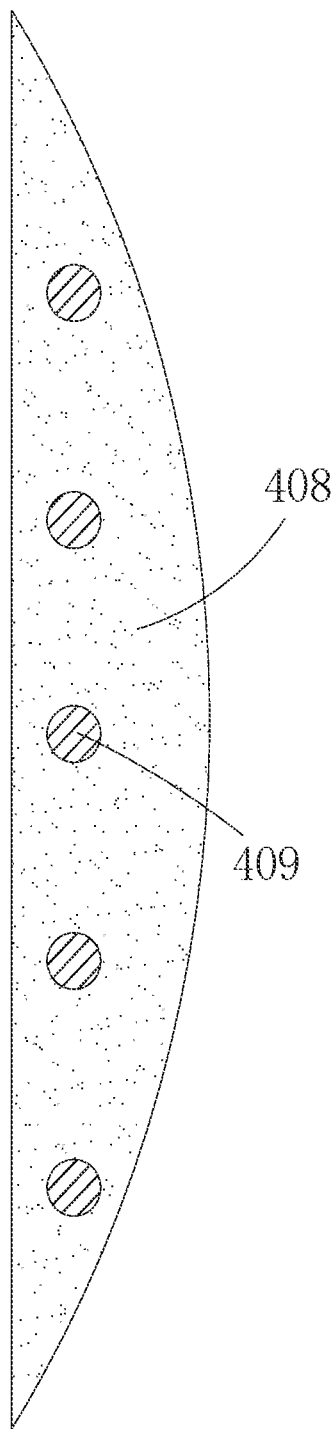
FIG. 7 is a sectional view of an elastic rubber block according to one embodiment of the present disclosure.
Figure 8:
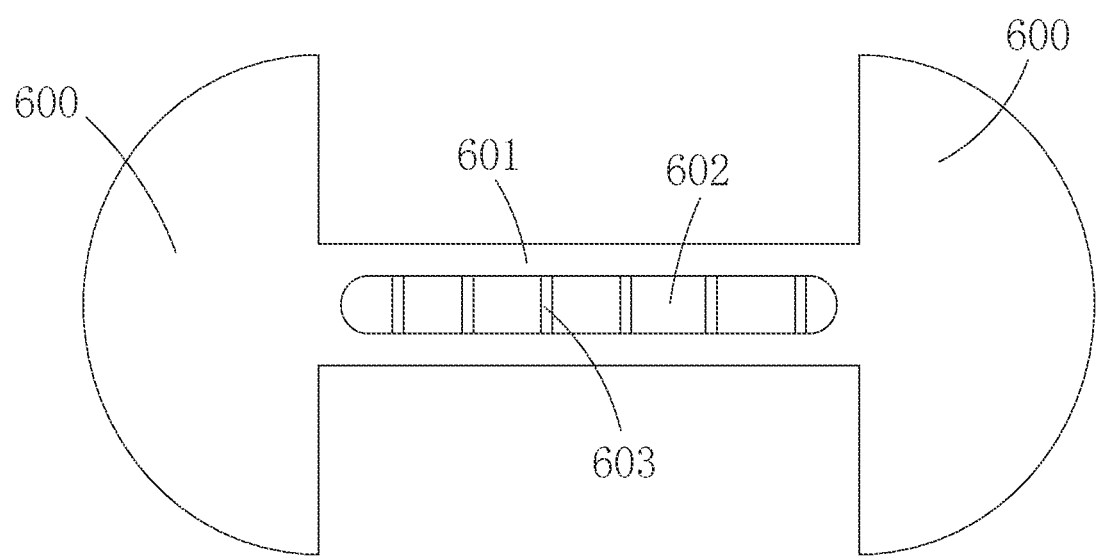
FIG. 8 illustrates an elastic structure according to one embodiment of the present disclosure.
Figure 9:
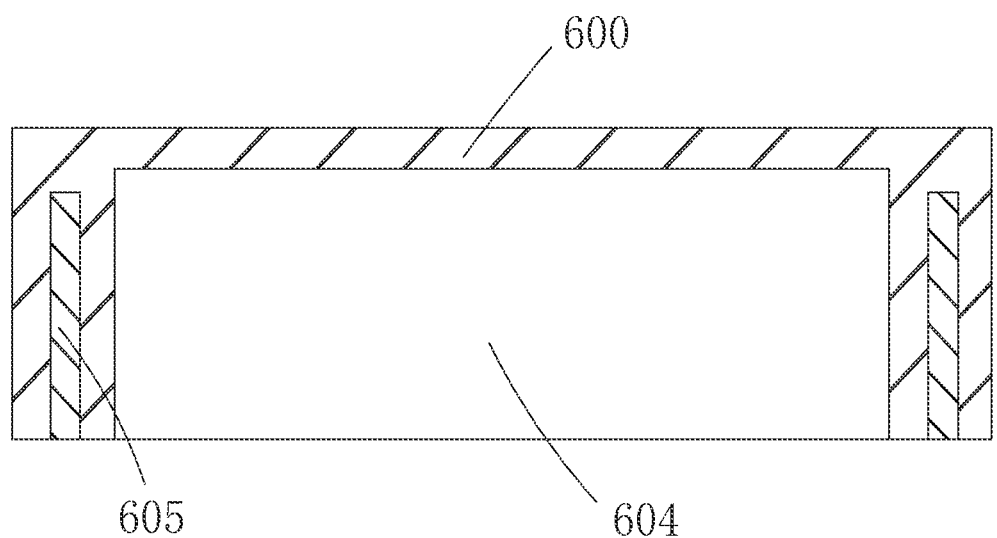
FIG. 9 is a sectional view of a connecting sleeve according to one embodiment of the present disclosure.

Referring to FIGS. 1-9, a preferred embodiment of the present disclosure is described below.

An electric toothbrush head provided in this embodiment is used to cooperate with a vibration unit 101 of a brush handle 100. The vibration unit 101 has a flat shape. After the electric toothbrush head is assembled with the brush handle 100, a complete electric toothbrush is formed.

The elastically-pressed electric toothbrush head includes a brush body 102. An insertion cavity 103 with a bottom opening is formed in a lower part of the brush body 102, A plug-in unit 200 is inserted into the insertion cavity 103 via the bottom opening. A lower part of the plug-in unit 200 has a guiding channel therein, and the bottom of the plug-in unit 200 has an insertion opening 201 for allowing insertion of the vibration unit 101 into the guiding channel. When the plug-in unit 200 is inserted in the insertion cavity 103, the plug-in unit 200 is fixed in the insertion cavity 103, and the bottom of the plug-in unit 200 can be placed within the insertion cavity 103 or exposed outside the insertion cavity 103.

An upper part of the plug-in unit 200 includes a friction arm 400 extending upward and an elastic arm 300 extending upward. The friction arm 400 and the elastic arm 300 are spaced apart and arranged opposite to each other, and cooperatively form a pressing channel 202 therebetween. A top of the guiding channel extends to a bottom of the pressing channel 202. Therefore, when the vibration unit 101 inserted into the guiding channel is inserted further upward, the vibration unit 101 can be inserted into the connection channel 202.

A central part of the elastic arm 300 is bent and convex towards the pressing channel 202 to form a bending section 301. An inner side of the bending section 301 has a pressing surface facing the pressing channel. An outer side of the bending section 301 has a non-pressing surface 303 facing an inner side wall of the insertion cavity 103, with an interval between the non-pressing surface 303 and the inner side wall of the insertion cavity 103. In this way, when the bending section 301 is subject to an outward pushing force, the bending section 301 will be elastically deformed outward. When the pushing force is revoked, the bending section 301 is elastically restored inward.

A central part of the friction arm 400 is bent and convex towards the pressing channel 202 to form a convex section 401, which is arranged opposite to the bending section 301 An inner side of the convex section 401 has a friction surface facing the pressing channel 202, and the friction surface is provided with a concave-convex structure. An outer side of the convex section 401 has a concave surface facing the inner side wall of the insertion cavity 103. A curved interval is formed between the concave surface and the inner side wall of the insertion cavity, and an elastic rubber block 408 is filled in the curved interval. The elastic rubber block 408 abuts against the inner side wall of the insertion cavity 103. A bending radian of the bending section 301 is greater than that of the convex section 401.

When the vibration unit 101 is inserted into the pressing channel 202, the degree of elastic deformation required by the friction arm 400 is much smaller than that of the elastic arm 300. In this way, through setting the bending radian of the convex section 401 and setting the elastic rubber block 408 in the curved interval, the deformation of the friction arm 400 within the set range is ensured to ensure its friction force against the vibration unit 101.

An elastic structure is connected between the top of the elastic arm 300 and the top of the friction arm 400. The vibration unit 101 is inserted into the guiding channel from bottom to top through the insert opening 201 and inserted into the pressing channel 202, and passes between the convex section 401 and the bending section 301. The pressing surface of the bending section 301 and the concave-convex structure of the convex section 401 press opposite sides of the vibration unit 101 respectively to fix the vibration unit 101 in the pressing channel 202. The convex section 401 and the bending section 301 are pressed by the vibration unit 101 to elastically deform towards the inner side wall of the insertion cavity 103 respectively. When the elastic arm 300 and the friction arm 400 deform away from each other, the elastic structure is elastically deformed and thus elongated.

When the elastic structure is elongated, the elastic structure applies opposite tension forces to the friction arm 400 and the elastic arm 300, which can make the friction arm 400 and the elastic arm 300 more stably clamp vibration core 101 therebetween and can avoid insufficient elasticity of the friction arm 400 and the elastic arm 300 after a long-time use.

According to the elastically pressed electric toothbrush head provided by the disclosure, when the vibration unit 101 is inserted into the pressing channel 202 via, the insert opening 201, the vibration unit 101 pushes the bending section 301 and the convex section 401 to elastically deform away from each other. With the pressing surface and the concave-convex structure on the friction surface clamping the vibration unit 101 in opposing directions, the vibration unit 101 is fixed in the pressing channel 202. Secondly, upon elastic deformation of the bending section 301 and the convex section 401 away from each other, the elongated elastic structure applies opposite tension to the elastic arm 300 and the friction arm 400, so that the pressing surface and the concave-convex lit structure can more stably clamp the vibration unit 101 therebetween with elastic pressing and clamping. The clamping is stable, which can better realize the vibration transmission between the vibration unit 101 and the electric toothbrush head.

The concave-convex structure comprises multiple elongated grooves 403 transversely extending on the friction surface, and the grooves 403 are arranged orderly and intervally along an extension direction of the friction arm 400. Elongated convexes 402 are formed between adjacent elongated grooves 403, which extend in the transverse direction. The elongated convexes 402 are used to press one side of the vibration unit 101. With multiple elongated convexes 402 pressing the side of the vibration unit 101 at multiple locations, more stable clamping of the vibration unit 101 can be achieved.

Each one of the elongated convexes 402 has a lower side surface 405 facing downward, an upper side surface 406 facing upward, and a pressing surface 407 configured to press one side of the vibration unit 101, and the pressing surface 407 is formed between the upper side surface 406 and the lower side surface 405. The lower side surface 405 of each one of the elongated convexes 402 is covered with an elastic rubber layer 404. An inner end of the elastic rubber layer 404 extends to a bottom of the elongated groove 403, and an outer end of the elastic rubber layer 404 extends to the pressing surface 407 of each one of the elongated convexes 402. A deformation interval is formed between the elastic rubber layer 404 and the upper side surface 405 of an adjacent one of elongated convexes 402.

When the vibration unit 101 is inserted into the pressing channel 202, the vibration unit 101 drives the electric toothbrush head to vibrate. When the electric toothbrush head moves upward relative to the vibration core 101, that is, when the vibration unit 101 moves downward in the pressing channel 202, due to the deformation interval between the elastic rubber layer 404 and the upper side surface 406 of the adjacent elongated convexes 402, the vibration unit 101 will compress the elastic rubber layer 404 downward to make the elastic rubber layer 404 deform downward. The compressed rubber layer 404 will produce an upward restoring force, which acts on the vibration unit 101. The vibration unit 101 correspondingly exerts a counterforce to drive the electric toothbrush head to move downward, so that the engagement between the electric toothbrush head and the vibration unit 101 is more stable, which can prevent the electric toothbrush head and the vibration core 101 from becoming disengaged during vibration.

There is a plurality of transversely extending steel wires 409 in the elastic rubber block 408, and the steel wires 409 are arranged at intervals along an extension direction of the friction arm 400. By setting the steel wires 409, the deformation direction of the elastic rubber block 408 can be limited, which facilities transverse deformation of the elastic rubber block 408 towards or away from friction arm 400.

A middle of the non-pressing surface 303 is recessed toward the pressing channel 202 and forms a transversely arranged deformation slot 302 that extends through opposite ends of the bending section 301. In this way, when the bending section 301 is pushed outward or restored inward, the deformation of the bending section 301 will be an elastic deformation centered around the deformation slot 302, ensuring the direction of the elastic deformation of the bending section 301 and facilitating the insertion of the vibration unit 101 in the pressing channel 202.

The elastic structure is made of a soft rubber material, comprising two connecting parts and a deformation section between the two connecting parts. Two ends of the deformation section are respectively connected with the connecting parts, and the two connecting parts are respectively connected at the top of the friction arm 400 and the top of the elastic arm 300. When the elastic arm 300 and the friction arm 400 deform away from each other, the deformation section is elongated and elastically deformed. The elongated deformation section produces pulling forces that pull the elastic arm 300 and the friction arm 400 toward each other, so that the convex section 401 and the bending section 301 can better hold the vibration unit 101.

The deformation section is provided therein with a hollow space 602 which extends along a path between the two connecting parts. The hollow space 602 divides the deformation section into two deformation strips 601 arranged in parallel. A plurality of connecting bars 603 made of soft rubber material is disposed in the hollow space 602, and the connecting bars 603 are arranged at regular intervals along a length direction of the hollow space 602. Opposite two ends of each connecting bar 603 are respectively connected with the two deformation strips 601.

By setting the hollow space 602, the deformation section is divided into two deformation strips 601, which facilitates the elastic deformation of the deformation section. By setting multiple connection bars 603, the elastic deformation of deformation strips 601 can be guided and constrained along a desired path to ensure the elastic deformation between the friction arm 400 and the elastic arm 300 toward each other or away from each other.

The connecting part is a connecting sleeve 600, and the connecting sleeve 600 has a sleeve cavity 604 with a downward opening. The sleeve cavity 604 of one connecting sleeve 600 is fixed on a top of the friction arm 400, and the other is fixed on a top of the elastic arm 300, with the deformation section being arranged between the friction arm 400 and the elastic arm 300.

The connection part is set as the connection sleeve 600, so that the whole elastic structure can be detachably arranged with the plug-in unit 200. The elastic structure and the plug-in unit 200 do not need to be formed as a unitary structure. On the contrary, they can be assembled when used. Before the plug-in unit 200 is inserted into the insertion cavity 103, the two connecting sleeves 600 of the elastic structure are set on the friction arm 400 and the elastic arm 300 respectively, and then the plug-in unit 200 is inserted into the insertion cavity 103. When the plug-in unit 200 is inserted into the insertion cavity 103, an outer periphery of the connection sleeve 600 is connected to the inner side wall of the insertion cavity 103 and is pressed to deform, so that the plug-in unit 200 can be firmly placed in the insertion cavity 103. In addition, the elastic connection between the elastic arm 300/the friction arm 400 and the inner side wall of the insertion cavity 103 can be realized, so that the elastic deformation of the friction arm 400 and the elastic arm 300 can be facilitated.

The sleeve cavity 604 has a peripheral wall with a metal ring 605 embedded in the peripheral wall, and the metal ring 605 is arranged along a circumferential direction of the sleeve cavity 604. This not only can achieve a more stable connection between the connecting sleeve 600 and the friction arm 400/elastic arm 300, and when the deformation section is elongated or reset deformation, but it also can keep a small deformation of the connecting sleeve 600 and keep the deformation concentrating on the deformation section.

The guiding channel has a top opening connected to pressing channel 202, and the top opening of the guiding channel is rectangular in shape and is defined by two non-pressing edges 2032 and two pressing edges 2033, the two non-pressing edges 2032 being arranged closer to the elastic arm 300 or the friction arm 400. The two pressing edges 2033 are arranged between the two non-pressing edges 2032, and the two pressing edges 2033 and the two non-pressing edges 2032 are connected to one another so as to cooperatively form a rectangular shape.

When the vibration unit 101 passes through the top opening of the guiding channel from bottom to top, the two pressing edges 2033 abut against two opposite sides of the vibration unit 101, respectively, and a gap 2031 is formed between each non-pressing edge 2032 and one corresponding side of the vibrating unit 101. In this way, the two non-pressing edges 2032 are set in the vibration direction of the vibration unit 101, which allows for the vibration of the vibration unit 101. Moreover, the two pressing edges 2033 abut against the opposite sides of the vibration unit 101, which can limit irregular vibration of the vibration unit 101 during vibration and hence ensure the regularity of the vibration of the vibration unit 101.

In this embodiment, the periphery of the lower part of the plug-in unit 200 is provided with an upper ring platform 204 that is oriented upwardly. A plurality of insert pins 205 protrudes from the upper ring platform 204, and the insert pin 205 are arranged around the circumference of the upper ring stage 204. The inner wall of the insertion cavity 103 is provided with a lower ring platform 105 that is oriented downwardly, and the lower ring platform 105 is recessed upward to form a plurality of receiving slots 104. When the plug-in unit 200 is inserted into the insertion cavity 103, the upper ring platform 204 abuts against the lower ring platform 105, with the insert pins 205 inserted into the receiving cavity 104, thereby ensuring a secure connection between the lower part of the plug-in unit 200 and the insertion cavity 103.

The foregoing is only a preferred embodiment of the disclosure and shall not be used to limit the disclosure. Any modification, equivalent replacement or improvement made within the spirit and principles of the disclosure shall be included within the scope of protection of the disclosure.

What is claimed is:

1. An elastically-pressed electric toothbrush head, comprising:
  a brush body, wherein an insertion cavity with a bottom opening is formed in a lower part of the brush body, a plug-in unit is inserted into the insertion cavity via the bottom opening, a lower part of the plug-in unit has a guiding channel therein, and a bottom of the plug-in unit has an insertion opening for allowing insertion of a vibration unit of flat shape into the guiding channel;
  wherein an upper part of the plug-in unit includes a friction arm extending upward and an elastic arm extending upward, the friction arm and the elastic arm are spaced apart to and arranged opposite to each other, the friction arm and the elastic arm cooperatively form a pressing channel therebetween, and a top of the guiding channel extends to a bottom of the pressing channel;
  wherein a central part of the elastic arm is bent and convex towards the pressing channel to form a bending section, an inner side of the bending section has a pressing surface facing the pressing channel, an outer side of the bending section has a non-pressing surface facing an inner side wall of the insertion cavity, with an interval between the non-pressing surface and the inner side wall of the insertion cavity;

wherein a central part of the friction arm is bent and convex towards the pressing channel to form a convex section, the convex section is arranged opposite to the bending section, an inner side of the convex section has a friction surface facing the pressing channel, the friction surface is provided with a concave-convex structure, an outer side of the convex section has a concave surface facing an inner side wall of the insertion cavity, a curved interval is formed between the concave surface and the inner side wall of the insertion cavity, an elastic rubber block is filled in the curved interval and the elastic rubber block abuts against the inner side wall of the insertion cavity; and wherein a bending radian of the bending section is greater than that of the convex section, and an elastic structure is connected between a top of the elastic arm and a top of the friction arm; the vibration unit is inserted into the guiding channel from bottom to top through the insert opening and inserted into the pressing channel and passes between the convex section and the bending section; the pressing surface of the bending section and the concave-convex structure of the convex section press opposite sides of the vibration unit respectively to fix the vibration unit in the pressing channel; the convex section and the bending section are pressed by the vibration unit to elastically deform towards the inner side wall of the insertion cavity respectively; when the elastic arm and the friction arm deform away from each other, the elastic structure is elastically deformed and thus elongated.

2. The elastically-pressed electric toothbrush head according to claim 1, wherein, the concave-convex structure comprises multiple elongated grooves transversely extending on the friction surface, and the elongated grooves are arranged orderly and intervally along an extension direction of the friction arm; elongated convexes are formed between adjacent elongated grooves, which extend in the transverse direction, and the elongated convexes are used to press one side of the vibration unit.

3. The elastically-pressed electric toothbrush head according to claim 2, wherein, each of the elongated convexes has a lower side surface downward, an upper side surface facing upward, and a pressing surface configured to press one side of the vibration unit, and the pressing surface is formed between the upper side surface and the lower side surface; the lower side surface of each one of the elongated convexes is covered with an elastic rubber layer; an inner end of the elastic rubber layer extends to a bottom of an adjacent one of the elongated grooves; an outer end of the elastic rubber layer extends to the pressing surface of the each one of the elongated convexes; and a deformation interval is formed between the elastic rubber layer and the upper side surface of an adjacent one of the elongated convexes.

4. The elastically-pressed electric toothbrush head according to claim 1, wherein, a plurality of transversely extending steel wires extends in the elastic rubber block, and the steel wires are arranged at intervals along an extension direction of the friction arm.

5. The elastically-pressed electric toothbrush head according to claim 1, wherein, a middle of the non-pressing surface is recessed toward the pressing channel and forms a transversely arranged deformation slot that extends through opposites ends of the bending section.

6. The elastically-pressed electric toothbrush head according to claim 1, wherein, the elastic structure is made of a soft rubber material, and comprises two connecting parts and a deformation section between the two connecting parts; two ends of the deformation section are respectively connected with the two connecting parts, and the two connecting parts are respectively connected at a top of the friction arm and a top of the elastic arm; when the elastic arm and the friction arm deform away from each other, the deformation section is elastically deformed and thus elongated.

7. The elastically-pressed electric toothbrush head according to claim 6, wherein, the deformation section is provided therein with a hollow space which extends along a path between the two connecting parts; the hollow space divides the deformation section into to two deformation strips arranged in parallel; a plurality of connecting bars made of soft rubber material is disposed in the hollow space, and the connecting bars are arranged at regular intervals along a length direction of the hollow space; and opposite two ends of each one of connecting bars are respectively connected with the two deformation strips.

8. The elastically-pressed electric toothbrush head according to claim 7, wherein, the connecting part is a connecting sleeve, and the connecting sleeve has a sleeve cavity with a downward opening; a sleeve cavity of one connecting sleeve is fixed on a top of the friction arm, and the other is fixed on a top of the elastic arm, with the deformation section being arranged between the fiction arm and the elastic arm.

9. The elastically-pressed electric toothbrush head according to claim 8, wherein, the sleeve cavity has a peripheral wall with a metal ring embedded in the peripheral wall, and the metal ring is arranged along a circumferential direction of the sleeve cavity.

10. The elastically-pressed electric toothbrush head according to claim 1, wherein, the guiding channel has a top opening connected to pressing channel, and the top opening of the guiding channel is rectangular in shape and defined by two non-pressing edges and two pressing edges, the two non-pressing edges being arranged closer to the elastic arm or the friction arm; and the two pressing edges are arranged between the two non-pressing edges, and the two pressing and two non-pressing edges are connected to one another so as to cooperatively form a rectangular shape;

wherein when the vibration unit passes through the top opening of the guiding channel from bottom to top, the two pressing edges abut against two opposite sides of the vibration unit, respectively, and a gap is formed between each non-pressing edge and a corresponding side of the vibration unit.

* * * * *